(12) United States Patent
Höller et al.

(10) Patent No.: US 6,597,763 B2
(45) Date of Patent: Jul. 22, 2003

(54) SPECTROMETER ARRANGEMENT (75) Inventors: Frank Höller, Aalen (DE); Martin Ross-Messemer, Essingen (DE); Alexander Menck, Jena (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/933,879

(22) Filed: Aug. 21, 2001

(65) Prior Publication Data
US 2002/0075996 A1 Jun. 20, 2002

(30) Foreign Application Priority Data
Aug. 21, 2000 (DE) .......................................... 100 40 813

(51) Int. Cl.$^7$ ................................................ G01T 1/36
(52) U.S. Cl. .......................... 378/82; 359/575; 356/328
(58) Field of Search ............................. 378/82, 81, 90, 378/70, 71, 73; 359/575, 573, 570, 572; 356/328, 326, 305, 334

(56) References Cited

U.S. PATENT DOCUMENTS

| | | | | | |
|---|---|---|---|---|---|
| 3,051,833 A | * | 8/1962 | Schumacher | ................ | 250/51.5 |
| 4,910,839 A | | 3/1990 | Wright | ........................ | 29/25.35 |
| 5,343,289 A | * | 8/1994 | Crawford et al. | ............ | 356/328 |
| 5,880,834 A | * | 3/1999 | Chrisp | ........................ | 356/328 |
| 5,914,997 A | * | 6/1999 | Van Egeraat | ................. | 378/45 |
| 6,226,349 B1 | * | 5/2001 | Schuster et al. | ............... | 378/84 |

* cited by examiner

*Primary Examiner*—Drew A. Dunn
*Assistant Examiner*—Irakli Kiknadze
(74) *Attorney, Agent, or Firm*—Rosenthal & Osha L.L.P.

(57) ABSTRACT

A spectrometer arrangement is disclosed for the determination of a radiation wavelength of radiation emitted from a radiation source to be measured. The arrangement includes a diffraction grating on which the radiation of the radiation source to be measured is incident at a predetermined angle, wherein the diffraction grating is provided by a reflection grating having a variable lattice constant. The arrangement also includes a radiation detector for receiving from the radiation source to be measured radiation diffracted at a predetermined angle at the diffraction grating.

22 Claims, 4 Drawing Sheets

SPECTROMETER ARRANGEMENT

CROSS-REFERENCE TO RELATED APPLICATIONS

This application claims priority from German Application Number 100-40-813.3 filed on Aug. 21, 2000.

BACKGROUND OF INVENTION

1. Field of the Invention

The invention relates generally to a spectrometer for the determination of a wavelength of a radiation emitted from a radiation source to be measured.

2. Background Art

Conventional spectrometers are used, among other things, to measure radiation spectra, i.e. to determine a wavelength-dependent intensity distribution of the radiation emitted from the radiation source. For this purpose, a dispersive element, such as a dispersion prism or a diffraction grating is used which deflects the incident beam to be measured by a wavelength-dependent angle. Thus, there is a spatial splitting of the radiation spectrum which can then be measured by disposing a location-sensitive radiation detector at a distance from the dispersive element or by moving a point detector having a comparatively small entry aperture in dependence on the location. In view of the known principle of the wavelength-dependent angle of deflection at the dispersive element, the location-dependent radiation intensity registered in this process can be converted to the wavelength-dependent intensity of the radiation, i.e. its spectrum.

SUMMARY OF INVENTION

A spectrometer arrangement is disclosed for the determination of a radiation wavelength of radiation emitted from a radiation source to be measured. The arrangement includes a diffraction grating on which the radiation of the radiation source to be measured is incident at a predetermined angle, wherein the diffraction grating is provided by a reflection grating having a variable lattice constant. The arrangement also includes a radiation detector for receiving from the radiation source to be measured radiation diffracted at a predetermined angle at the diffraction grating.

Other aspects and advantages of the invention will be apparent from the following description and the appended claims.

DETAILED DESCRIPTION

One embodiment of the invention starts from a conventional spectrometer arrangement which comprises a diffraction grating for the determination of a radiation wavelength on which the radiation is incident at a predetermined angle, and a radiation detector for receiving radiation diffracted at a predetermined angle at the diffraction grating. This embodiment of the invention may be characterized in that the diffraction grating is designed as a reflection grating having a variable lattice constant.

Typically, in conventional spectrometer arrangements, a reflection grating comprises a fixed lattice constant. This means that the linear structures, which are optically effective and periodically arranged in a grating plane or surface of the diffraction grating, respectively, and which in combination generate the diffraction effect of the lattice, are arranged at a fixed invariable distance from each other. In the case of such a conventional grating there is a fixed relationship between the wavelength of the radiation incident on the grating and the angle of diffraction under which the incident radiation is diffracted into a certain diffraction order by the diffraction grating. In order to determine the radiation spectrum, the angle between the radiation detector and the diffraction grating has to be varied for example by turning the diffraction grating, moving the detector or using a location-sensitive detector.

In one embodiment of the diffraction grating of the invention, for the determination of the radiation spectrum, the radiation detector and the radiation source can remain disposed under a fixed angle with reference to the diffraction grating, since, for example, through continuous variation of the lattice constants other radiation wavelengths of the radiation to be measured are diffracted step by step in the direction of the detector. Thus, the measured radiation intensity can be determined in dependence on the lattice constant, from which the wavelength-dependent radiation intensity, i.e. the radiation spectrum, can be determined.

In another embodiment, a spectrometer arrangement is provided which does not necessarily require a movable radiation detector or a location-sensitive radiation detector or a mechanism for turning the diffraction grating, which may allow for a simple setup of the spectrometer arrangement.

In another embodiment, the diffraction grating with variable lattice constant is provided by surface acoustic waves on a surface of a surface acoustic wave device. It has shown that mechanical surface acoustic waves, i.e. deflections of the surface transversely thereto, which are generated on the surface of the device and propagate thereon in one propagation direction may be optically effective and may be effective as reflection grating in their periodic arrangement. Further, in the case of a suitable surface acoustic wave device the wavelength of the surface waves is variable in a certain range so that through variation of this wavelength the distance between the periodic structures, namely the wave crests and the wave troughs of the surface acoustic wave, is variable, which is equivalent to a variation of the lattice constant of the diffraction grating.

For the provision of such a surface acoustic wave device, a plurality of alternatives has been known. One alternative provides to generate the surface acoustic waves on the surface of a $LiNbO_3$ monocrystal. For this purpose an electroacoustic transducer is disposed on a part of the surface of the crystal, which transducer transforms a high-frequency electric voltage into mechanical surface acoustic waves. So-called interdigital electrodes have been known as possible electroacoustic couplers. The wavelength of the generated surface acoustic waves is determined by the frequency of the voltage applied to the electroacoustic transducer.

In another embodiment, the surface acoustic wave device may comprise a frequency-variable controller for exciting the surface acoustic waves and for changing the wavelength in order to change the lattice constant and, thus, the period of the surface acoustic waves. From the relation known for a certain surface acoustic wave device between excitation frequency and wavelength of the generated surface acoustic waves, the excitation frequency required for the setting of a desired lattice constant can be calculated.

In another embodiment, the surface acoustic wave device comprises a temperature sensor for the determination of the temperature of the surface of the surface acoustic wave device. It has been found that the wavelength of the generated surface acoustic waves does not only depend on the excitation frequency but also on the temperature of the surface. Knowing the relationship between excitation frequency, temperature and wavelength for a certain surface acoustic wave device, the frequency necessary for the generation of a desired lattice constant can be determined under consideration of the momentary temperature of the surface acoustic wave device.

In another embodiment, the temperature sensor determines the temperature of the surface without providing physical contact between the surface and the sensor in order to disturb the propagation of the surface acoustic waves on this surface as little as possible. For this purpose, suitable temperature sensors have been known from the prior art in the form of radiation detectors or infrared detectors.

In another embodiment, in order the be able to set the desired lattice constant as accurately as possible, the spectrometer arrangement itself may comprise a device for measuring this lattice constant. In another embodiment, a reference radiation source arrangement is provided for this purpose whose radiation wavelength is known with a high degree of accuracy. Lasers may be suitable here. The radiation of the reference radiation source arrangement is transmitted to the diffraction grating under a predetermined angle and, further, a reference detector is disposed under a predetermined angle relative to the diffraction grating, in order to detect diffracted radiation of the reference radiation source arrangement. In the case of a known wavelength of the radiation emitted from the reference radiation source arrangement and known angular relationship between diffraction grating and reference detector, the lattice constant of the diffraction grating can be determined with a comparably high accuracy. When the determined lattice constant deviates from a desired value, the lattice constant can then be readjusted correspondingly. In the surface acoustic wave device described above, this is may be done by changing the excitation frequency.

In order to be able to determine accurately the variable lattice constant for several of its values, the reference detector may be designed as a location-sensitive line detector.

In an arrangement such that the surface of the diffraction grating has a concave curvature in a form which approximates a partial surface of a cylinder or a sphere, diffraction grating, reference radiation source arrangement and reference detector may be disposed in a Rowland arrangement.

In another embodiment, the lattice constant of the diffraction grating is adjustable such that effective diffraction for comparatively short radiation wavelengths occurs. Short radiation wavelengths and preferred applications of the spectrometer arrangement wavelengths in EUV (extreme ultraviolet) are considered in this case. In one embodiment, radiation wavelengths are between 0.1 nm and 100 nm. In another embodiment, radiation wavelengths are between 1 nm and 50 nm. In another embodiment, radiation wavelengths are between 12 nm and 14 nm.

In another embodiment, a first geometrical arrangement of the components of the spectrometer arrangement provides that the surface of the diffraction grating has a concave curvature, in one embodiment in the shape of a partial surface of a cylinder or a sphere. In this case it is not essential that the surface of the diffraction grating has the exact shape of partial surface of the cylinder or sphere. Rather, the surface should have this approximate form, the actual design of the spectrometer arrangement allowing deviations from this form under the conditions of the respective application and sufficient efficiency of the spectrometer arrangement being achieved all the same.

In another embodiment, in a curved design of the diffraction grating, the radiation source to be measured and an entry aperture of the radiation detector may be provided in a so-called Rowland arrangement. A spectrometer arrangement with increased efficiency may also be provided in that at least one of the components: radiation source to be measured and/or entry aperture of the radiation detector, may be disposed on the cylinder or the sphere, respectively.

In another embodiment, the arrangement of the components on the Rowland circle or the cylinder or the sphere, respectively, in the case of a given emission rate of the radiation source to be measured, serves to depict an enlarged solid angle of the emitted radiation on the detector, in order to increase the radiation intensity detected by the latter and thereby the accuracy and efficiency of the spectrometer arrangement.

In another embodiment, a second geometrical arrangement of the components of the spectrometer arrangement is provided which, for focussing on the detector the radiation diffracted at the diffraction grating, uses a concave mirror surface formed as a partial surface of an ellipsoid. Here the radiation detector is disposed in a first focal point of the ellipsoid. The diffraction grating is arranged between the concave mirror surface and the second focal point of the ellipsoid, namely in a way that the surface of the diffraction grating is oriented transversely relative to a connecting line between mirror surface and second focal point.

In another embodiment, in the transmission of the radiation to be measured onto the diffraction grating, there are portions of radiation which comprise such a wavelength that the portions of radiation are sent from the diffraction grating to the mirror under such an angle that they seem to come from the second focal point of the ellipsoid—from the aspect of the mirror. In other words, for these portions of radiation a virtual radiation source is arranged at the second focal point of the ellipsoid. This virtual radiation source is imaged by the ellipsoid mirror onto and detected by the radiation detector disposed at the first focal point of the ellipsoid. Portions of radiation of the radiation source which do not comprise the wavelength required seem to come from a virtual radiation source—from the aspect of the mirror—which does not coincide with the second focal point of the ellipsoid. These portions of radiation, thus, are not imaged by the ellipsoid mirror onto the first focal point of the ellipsoid and thus they are not detected by the radiation detector either. Thus, by changing the lattice constant portions of radiation having different wavelengths are detected step by step by the radiation detector, the radiation spectrum of the radiation source thus becoming determinable.

In order to arrange the location of the virtual radiation source seen by the mirror near the second focal point of the ellipsoid for at least one radiation wavelength, a location may be provided for the arrangement of the radiation source which has a distance from the diffraction grating equal to the distance between the grating and the second focal point of the ellipsoid.

Figure 1:
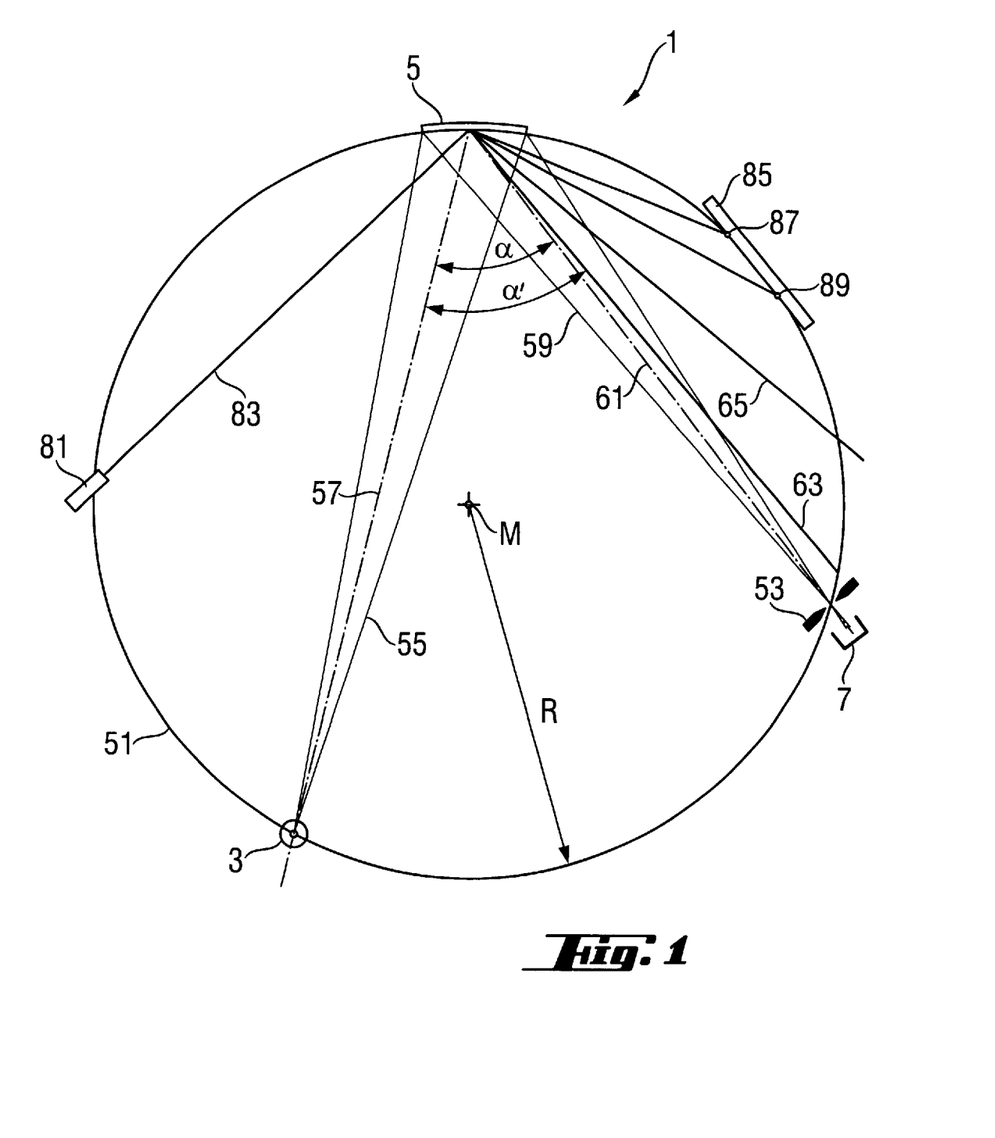
FIG. 1 shows a first embodiment of a spectrometer arrangement according to the invention.

Referring to FIG. 1, a spectrometer arrangement 1 is shown schematically as a first embodiment of the invention. It comprises a radiation source 3 whose spectrum is to be determined, as well as a diffraction grating 5 with variable lattice constants and a detector 7. The diffraction grating 5 with variable lattice constant is provided by a surface acoustic wave device (shown in detail in FIGS. 2 and 3).

Figure 2:
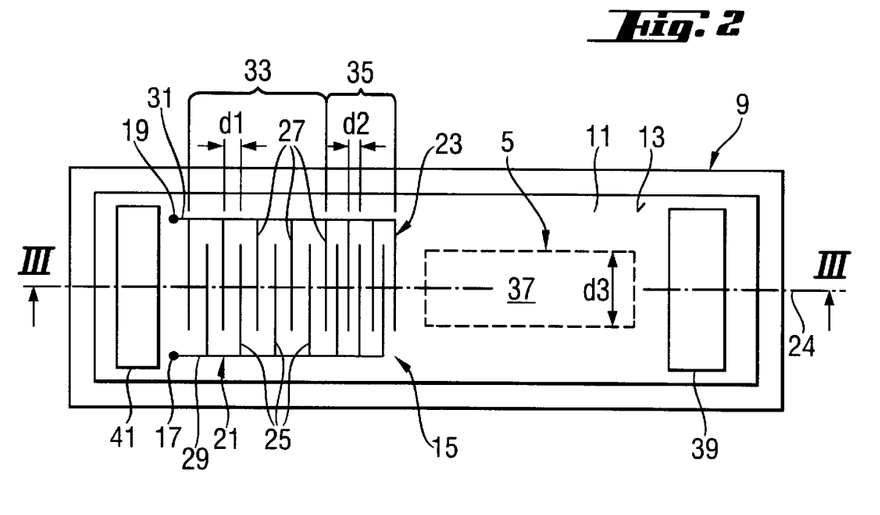
FIG. 2 shows a top view of a surface acoustic wave device used in the spectrometer arrangement of FIG. 1.
Figure 3:
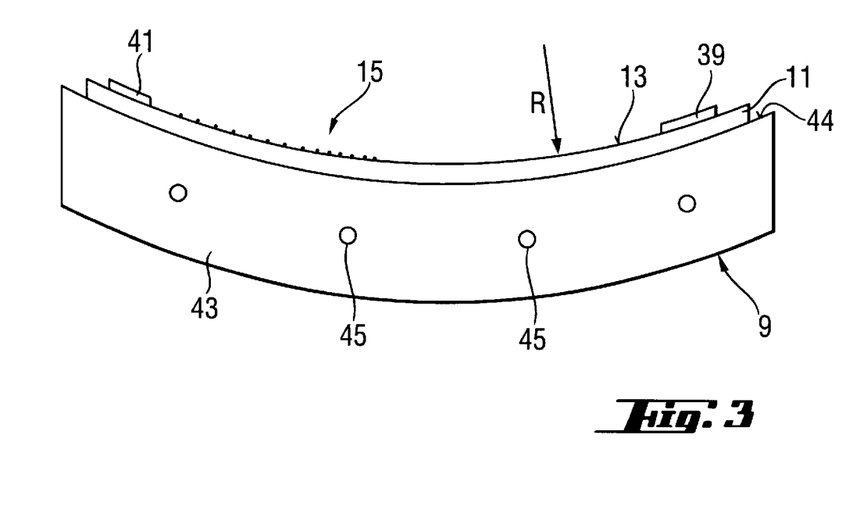
FIG. 3 shows a longitudinal section along line III—III of the surface acoustic wave device of FIG. 2.

The surface acoustic wave device 9 comprises a monocrystal 11 of piezoelectric material having a polished surface 13 on which surface acoustic waves are generated. The surface acoustic waves generate periodically arranged deflections (crests and troughs) of surface 13 which are optically effective and thus form periodically arranged diffraction structures, so that surface 13 with its surface acoustic waves excited thereon, can act as diffraction grating for electromagnetic waves radiated thereon.

For exciting the surface acoustic waves, a set of interdigital electrodes 15 having two terminals 17 and 19 for supplying high-frequency electrical voltage is provided on surface 13 as an electromechanical transducer. The interdigital electrodes 15 are formed as two engaging comb-like structures 21 and 23 each of which comprises a plurality of finger electrodes 25 and 27 arranged transversely to a longitudinal axis 24 of surface acoustic wave device 9. Every other finger electrode 25 is connected via a line 29 with terminal 17, whereas each further finger electrode 27 arranged between finger electrodes 25 is connected to terminal 19 via line 31.

The interdigital electrodes 15 comprise a region 33 in which adjacent finger electrodes 25, 27 are disposed at a distance d1 from each other, whereas in a region 35 of interdigital electrodes 15 adjacent finger electrodes 25, 27 are disposed at a distance d2 from each other, which is less than the distance d1 of the region 33. Such an arrangement of interdigital electrodes 15 is termed as the so-called "piggyback electrode arrangement". This means that not all of the finger electrodes are disposed at an equal distance from each other, but in which several regions are provided in which the finger electrodes are arranged in groups which have different distances from each other. Such a "piggyback electrode arrangement" is particularly suited for the generation of surface acoustic waves with differing wavelengths.

By applying an electric alternating voltage to connections 17 and 19, an electrical alternating field is generated between the respective adjacent finger electrodes 25, 27, which alternating field induces surface acoustic waves on the surface 13 of monocrystal 11. The wavelength of the surface acoustic waves is determined here substantially by the frequency of the applied electric voltage, the wavelength of the surface acoustic waves being also variable by a change of frequency of the electric voltage. By using the piggyback electrode arrangement, the range in which the wavelength of the surface acoustic waves is variable is comparatively large, since short wavelengths are generated with increased efficiency between adjacent finger electrodes in region 35 having a small distance d2, and surface acoustic waves with greater wavelength are generated with increased efficiency in region 33 in which adjacent finger electrodes have the greater distance d1 from each other. In the case of intermediate wavelengths, the surface acoustic waves are induced in both regions 33, 35.

The generated surface acoustic waves propagate along axis 24 on surface 13 of monocrystal 11, a region 37 being provided on the surface 13 shown by dashed lines in FIG. 2 to the right of interdigital electrodes 15, in which region the surface acoustic waves propagate substantially undisturbed and continuously. This region 37 with uniform propagation of the surface acoustic waves is used as optically effective region for diffraction grating 5.

In order not to disturb the uniform propagation of the surface acoustic waves in region 37 by surface acoustic waves reflected from the edges of monocrystal 11, an attenuation mass 39 is applied to surface 13 of the monocrystal to the right of the effective region 37, in order to absorb surface acoustic waves which have passed through the optically effective region 37 and enter the region of the attenuation mass 39. It is thus avoided that these surface acoustic waves reach the edges of monocrystal 11 from which they could be reflected back into region 37.

Since interdigital electrodes 15 further also generate surface acoustic waves, which in FIG. 2 move to the left away from the interdigital electrodes, to the left of the same another attenuation mass 41 is applied on surface 13 of monocrystal, in order to absorb these surface acoustic waves which cannot be used in region 37, so that they do not disturb the propagation of the desired surface acoustic waves in region 37 via reflections at the edges of monocrystal 11 either.

The monocrystal 11 is thermoconductively fixed on a cooling element 43 having a curved surface 44 wherein the radius of curvature is R. A coolant flows through the cooling element in pipes 45.

The monocrystal 11 is formed of lithium niobate, $LiNbO_3$ which is applied to cooling element 43 by means of a temperature conducting adhesive, and the cooling element is made of copper. The distances d1 and d2 between adjacent finger electrodes 25, 27 amount to 35 $\mu$m or 25 $\mu$m, respectively. The interdigital electrodes 15 are applied on surface 13 of monocrystal 11 preferably by means of a lithographic method, a width d3 of effective region 37 (aperture) preferably amounting to 0.8 mm.

The frequency of the voltage applied to connections 17, 19 for the generation of the surface acoustic waves varies between 100 and 200 MHz, the electric power supplied to interdigital electrodes 15 amounting to approximately 2 Watts. In this dimensioning, surface acoustic waves with wavelengths in the range between 25 $\mu$m and 35 $\mu$m can be generated with sufficient intensity in order to form an effective optical grating. A conventional thermoconductive adhesive is used for the thermoconductive attachment of the monocrystal 11 to cooling element 43.

Due to the curvature of cooling element 43, surface 13 of monocrystal 11 is also curved with the approximate radius of curvature R, so that the plane providing the diffraction grating 5 approximates a partial cylinder surface. In FIG. 1 the cylinder surface is shown as circle 51 around a center M and radius R. The radiation source 3, whose spectrum is to be measured, and an entry aperture 53 of radiation detector 7 are also disposed on cylinder surface 51, so that a geometry of the spectrometer arrangement conventionally referred to as "Rowland arrangement" is formed.

From the radiation emitted from radiation source 3 a bundle of beams 55 with a central beam 57 is incident on diffraction grating 5 and is diffracted thereon among other orders, in first and second order. Of the first diffraction order a partial beam 59 with central beam 61 enters into aperture 53 of detector 7, so that detector 7 detects the intensity of partial beam 59 and outputs a corresponding measuring signal. The diffraction angle α occurring here is determined by the lattice constant of diffraction grating 5 and the wavelength $\lambda_s$ of diffracted beam 59. A portion of radiation 55 which comprises a wavelength $\lambda_s'$ deviating herefrom, is diffracted by an angle α' which is different from angle α in a way that such a diffracted beam given reference numeral 63 in FIG. 1 does not enter detector 7 through aperture 53. However, the lattice constant of diffraction grating 5 is variable such that beam 63 will be diffracted by angle α and enter detector 7, whereas beam 61 will then however, no longer enter the detector. Thus, by changing the lattice constant of diffraction grating 5 the intensity of the radiation emitted from radiation source 3 can be determined dependent upon its wavelength by detector 7.

FIG. 1 also shows a beam 65 of the second diffraction order whose angle of diffraction differs from angle of diffraction α detected by detector 7 by an amount such that it will never enter detector 7 when the lattice constant is changed in the accessible range.

Figure 4:
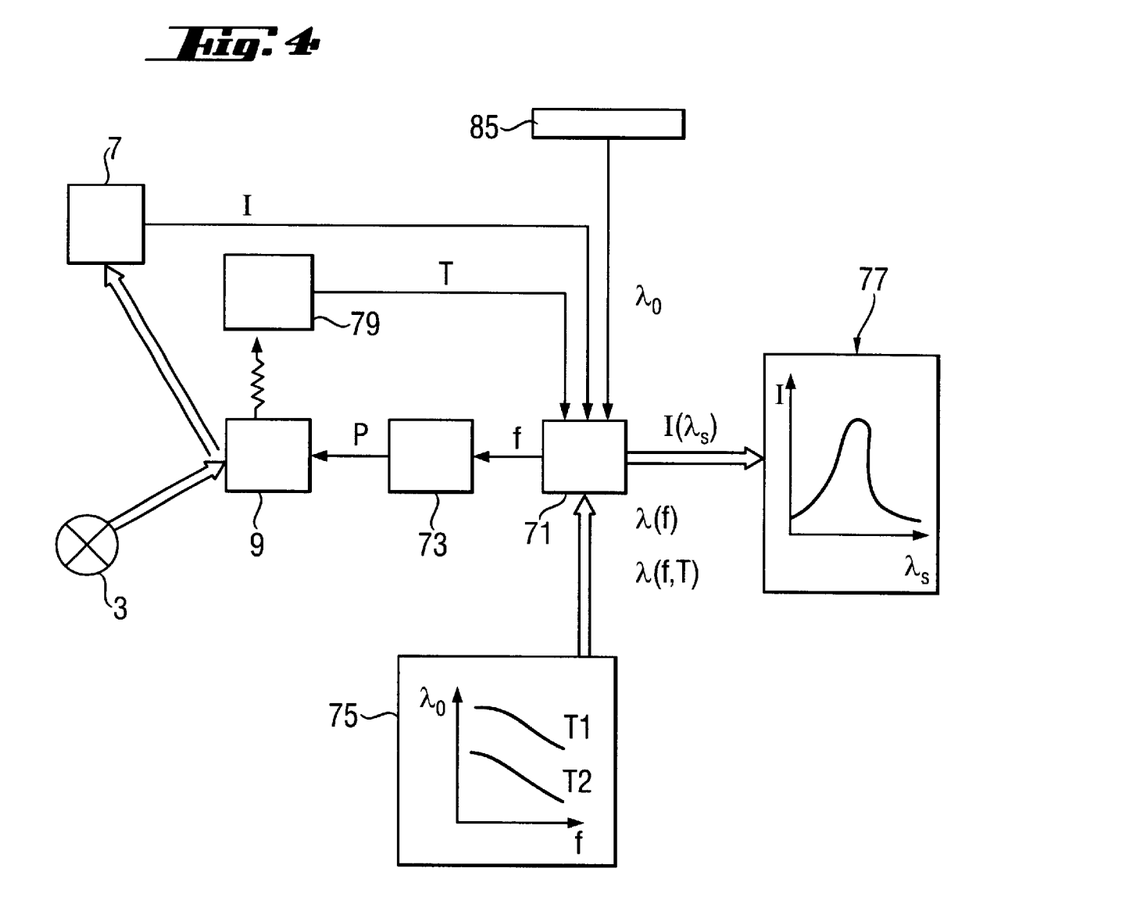
FIG. 4 shows a schematic representation of a measuring method used in connection with the spectrometer arrangement of FIG. 1.

A schematic functional representation of an apparatus for measuring the spectrum of radiation source 3 is shown in FIG. 4. The apparatus comprises a control and calculating unit 71 which determines for surface acoustic wave device 9 a frequency f for a frequency generator 73 which supplies a high frequency power P having corresponding frequency f to terminals 17, 19 of interdigital electrodes 15 of surface acoustic wave device 9. The radiation intensity registered by detector 7 is supplied to control and calculating unit 71 as an intensity signal I. By changing the frequency f in the accessible range, control and calculating unit 71 takes up the diffracted intensity I dependent upon the surface acoustic wave frequency f.

Further, a memory 75 is provided in which the dependency between the excitation frequency of the surface acoustic waves and the wavelength $\lambda_t$ thereof is stored. Through access to the memory 75, calculating unit 71 then determines the measured intensity I dependent upon the wavelength $\lambda_o$ and the lattice constant of diffraction grating 5, respectively. From the known diffraction law this in turn can be converted into the radiation intensity dependent upon radiation wavelength $\lambda_s$ which represents the desired measuring result, namely the radiation spectrum, which is represented by calculating unit 71 on a monitor in the form of a diagram 77, for example.

For the accuracy of the measured radiation spectrum I ($\lambda_s$) it is essential to know lattice constant $\lambda_o$ at a given excitation frequency f. Since the wavelength $\lambda_o$ of the surface acoustic waves at a given frequency f also depends on the temperature of surface 13 of surface acoustic wave device 9, there is a temperature sensor 79 provided for achieving a greater measuring exactness. The temperature sensor 79 detects in a contactless manner infrared radiation emitted from surface 13 and supplies a corresponding temperature signal T characterizing the surface temperature to calculating unit 71.

Memory 75 contains entries which characterize the wavelength $\lambda_o$ dependent upon frequency f as well as temperature T.

For a still more exact determination of wavelength $\lambda_o$ dependent upon excitation frequency f, the spectrometer arrangement of FIG. 1 comprises a reference radiation source 81, for example a helium neon laser whose radiation wavelength is known very accurately. The exit window of reference radiation source 81 is also disposed on the Rowland circle 51, and a beam 83 emitted from the source is incident on diffraction grating 5 under a predetermined angle simultaneous with the radiation to be measured and is diffracted on a location-sensitive detector 85 which is also disposed on the Rowland circle 51. Via the location-sensitive radiation detector 85, the angle can be determined with great accuracy under which the reference beam 83 is diffracted by diffraction grating 5, whereupon also lattice constant $\lambda_o$ of diffraction grating 5 can be determined with great exactness applying the principle of diffraction. In FIG. 1, a location 87 is illustrated on location-sensitive detector 85 on which diffracted reference beam 83 is incident, when diffracted beam 61 of radiation source 3 to be measured falls into entry aperture 53 of the detector. If the lattice constant of diffraction grating 5 is varied so far that beam 63 impinges on detector 7, the diffracted beam of reference radiation source 81 impinges on location 89 on detector 85.

Thus, the lattice constant of diffraction grating 5 can also be determined from wavelength $\lambda_o$ of the surface acoustic waves measured directly via location-sensitive detector 85.

Hereafter further embodiments of the spectrometer arrangement shown in FIGS. 1 to 4 are explained. With regard to their structure and their function, corresponding components are given the reference numerals of FIGS. 1 to 4, and for distinction a letter is added. For explanation, reference is made to the entire preceding description of a first embodiment of the invention.

Figure 5:
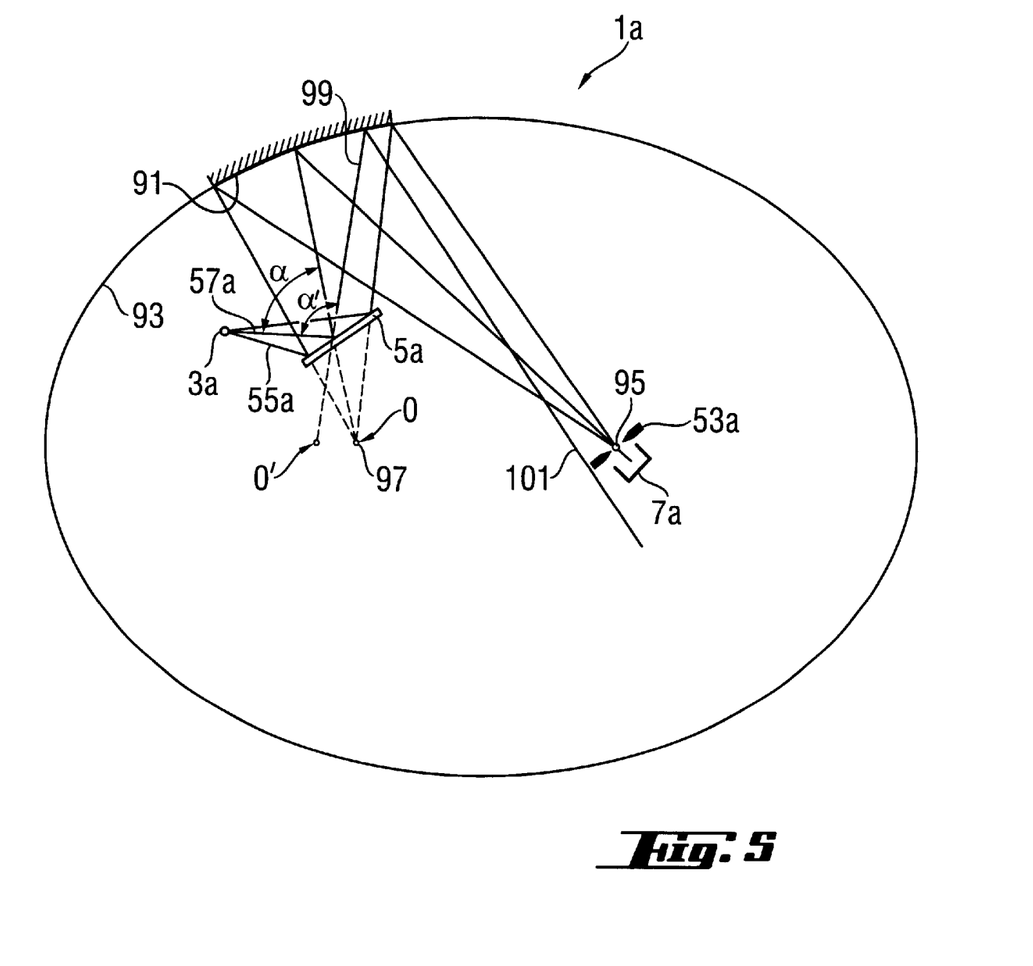
FIG. 5 shows another embodiment of the spectrometer arrangement according to the invention.

In FIG. 5 a spectrometer arrangement 1a of another embodiment of the invention is represented schematically. This embodiment comprises a mirror 91 whose mirror surface is formed as a partial surface of an ellipsoid 93. In a first focal point 95 of ellipsoid 93, an entry aperture 53a of a radiation detector 7a is disposed. A diffraction grating 5a having a variable lattice constant is disposed transversely on a connecting line between mirror 91 and a second focal point 97 of ellipsoid 93. A radiation source 9a to be measured is disposed in a way that radiation emitted therefrom and to be measured is incident on diffraction grating 5a and is diffracted by the latter in the direction towards mirror 91. A bundle of beams 55a having a central beam 57a with a wavelength $\lambda_s$ is diffracted by diffraction grating 5a under such an angle that this bundle of beams seems to come from a virtual radiation source O—from the aspect of the mirror 91—which radiation source O is disposed at second focal point 97 of ellipsoid 93.

Radiation coming from the first focal point of an ellipsoid mirror, as is known, is imaged on the second focal point of the ellipsoid by the ellipsoid mirror. Therefore, the radiation having wavelength $\lambda_s$, which is diffracted by angle α will enter into radiation detector 7a via entry aperture 53a, so that the detector outputs a corresponding measuring signal I for the intensity of the radiation with wavelength $\lambda_s$.

The radiation of radiation source 3a which has a wavelength $\lambda_s'$ different therefrom, is diffracted for example by an angle α' different from angle α, as is shown in FIG. 5 for a central beam 99. From the aspect of the mirror this radiation seems to come from a virtual radiation source O' which is not located at the second focal point of ellipsoid 97. Accordingly, this radiation is not imaged on entry slot 53a of detector 7a and is not detected by it either, as this is shown in FIG. 5 by a reflection 101 of beam 99.

Thus, the intensity of the radiation emitted from radiation source 3a can be determined dependent upon its wavelength $\lambda_s$ also by means of the spectrometer arrangement shown in FIG. 5, and the measuring method explained in connection with FIG. 4 can also be applied.

Advantages of the invention may include one or more of the following:

To provide an alternative arrangement for a spectrometer;

To provide a spectrometer which does not require a location-sensitive detector or a movable point detector; and To provide an arrangement for a spectrometer which has a simple setup and allows for quick determination of the spectrum to be measured.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A spectrometer arrangement for the determination of a radiation wavelength of radiation emitted from a radiation source to be measured, comprising:

a diffraction grating on which the radiation of the radiation source to be measured is incident at a predetermined angle; and a radiation detector for receiving from the radiation source to be measured radiation diffracted at a predetermined angle at the diffraction grating;

wherein the diffraction grating is provided by a reflection grating having a variable lattice constant.

2. The spectrometer arrangement according to claim 1, wherein a surface, along which the diffracting structures of the diffraction grating are disposed, is of concave curvature, and is a partial surface of at least one of a cylinder and a sphere.

3. The spectrometer arrangement according to claim 2, wherein the diffraction grating, the radiation source to be measured and an entry aperture of the radiation detector for receiving the radiation diffracted at the diffraction grating are disposed in a Rowland arrangement.

4. The spectrometer arrangement according to claim 2, wherein at least one of the radiation source to be measured and an entry aperture of the radiation detector for receiving the radiation diffracted at the diffraction grating are arranged on at least one of the cylinder and the sphere.

5. The spectrometer arrangement according to claim 2, further comprising a reference radiation source arrangement for the determination of the lattice constant of the diffraction grating wherein the radiation of the reference radiation source arrangement is incident on the diffraction grating at a predetermined wavelength, and a reference detector for receiving radiation emitted from the reference radiation source arrangement and diffracted at the diffraction grating, wherein at least one of the reference radiation source and the reference detector are disposed on at least one of the cylinder and the sphere.

6. The spectrometer arrangement according to claim 1, further comprising a mirror having a concave mirror surface in the form of a partial surface of an ellipsoid for reflecting radiation to be measured, wherein the radiation detector comprises an entry aperture arranged in a first focal point of the ellipsoid, wherein the diffraction grating is arranged between the mirror and a second focal point of the ellipsoid, so that the radiation to be measured is incident on the diffraction grating and is diffracted by the latter in the direction towards the mirror.

7. The spectrometer arrangement according to claim 6, wherein a location provided for the arrangement of the radiation source is at a distance from the diffraction grating which is equal to the distance between the diffraction grating and the second focal point of the ellipsoid.

8. The spectrometer arrangement according to any one of claims 1 to 7, wherein the diffraction grating is provided by surface acoustic waves on a surface of a surface acoustic wave device.

9. The spectrometer according to claim 8, wherein the surface acoustic wave device comprises a frequency-variable control device for exciting the surface acoustic waves.

10. The spectrometer arrangement according to claim 8, wherein the surface acoustic wave device comprises a temperature sensor for determining a temperature of a surface of the diffraction grating.

11. The spectrometer arrangement according to claim 10, wherein the frequency is adjustable by the control device in response to the temperature of the surface.

12. The spectrometer arrangement according to any one of claims 1 to 7, further comprising a reference radiation source arrangement for the determination of the lattice constant of the diffraction grating wherein the radiation of the reference radiation source arrangement is incident on the diffraction grating at a predetermined wavelength, and a reference detector for receiving radiation emitted from the reference radiation source arrangement and diffracted at the diffraction grating.

13. The spectrometer arrangement according to claim 12, wherein the reference detector is a location-sensitive line detector.

14. The spectrometer according to claim 12, wherein the reference radiation source and the reference detector are disposed in a Rowland arrangement.

15. The spectrometer arrangement according to any one of claims 1 to 7, wherein the radiation wavelength comprises short radiation wavelengths between 0.1 nm and 100 nm.

16. The spectrometer arrangement according to any one of claims 1 to 7, wherein the radiation wavelength comprises short radiation wavelengths between 1 nm and 50 nm.

17. The spectrometer arrangement according to any one claims 1 and 7, wherein the radiation wavelength comprises short radiation wavelengths between 12 nm and 14 nm.

18. A method for the determination of a radiation wavelength of radiation emitted from a radiation source to be measured with a spectrometer arrangement, comprising:

disposing the spectrometer arrangement with reference to the radiation source such that the radiation to be measured is incident on a diffraction grating, wherein the diffraction grating is provided by a reflection grating having a variable lattice constant; and measuring an intensity of radiation diffracted at the diffraction grating and received by a detector.

19. The method of claim 18, further comprising varying the lattice constant of the diffraction grating in order to direct the radiation of a desired radiation wavelength towards the detector.

20. The method of claim 19, wherein the varying comprises varying an electric signal that controls surface acoustic waves on a surface acoustic wave device.

21. The method of claim 18, further comprising:

determining a temperature of the diffraction grating, wherein the varying is dependent upon the temperature.

22. The method of claim 18, further comprising:

determining the lattice constant of the diffraction grating.

* * * * *

UNITED STATES PATENT AND TRADEMARK OFFICE
CERTIFICATE OF CORRECTION

PATENT NO. : 6,597,763 B2
DATED : July 22, 2003
INVENTOR(S) : Holler et al.

It is certified that error appears in the above-identified patent and that said Letters Patent is hereby corrected as shown below:

Title page,
Item [73], please replace the Assignee name with -- Carl-Zeiss-Stiftung trading as Carl Zeiss --.

Signed and Sealed this

Eighteenth Day of November, 2003

JAMES E. ROGAN
*Director of the United States Patent and Trademark Office*